US008265804B1

(12) United States Patent
Uetrecht et al.

(10) Patent No.: US 8,265,804 B1
(45) Date of Patent: Sep. 11, 2012

(54) METHOD AND SYSTEM FOR CONTROLLING A VEHICLE

(75) Inventors: David S. Uetrecht, Palos Verdes Estates, CA (US); David D. Needelman, Torrance, CA (US); Tung-Ching Tsao, Cupertino, CA (US)

(73) Assignee: The Boeing Company, Chicago, IL (US)

( * ) Notice: Subject to any disclaimer, the term of this patent is extended or adjusted under 35 U.S.C. 154(b) by 656 days.

(21) Appl. No.: 12/475,072

(22) Filed: May 29, 2009

(51) Int. Cl.
*B64G 1/36* (2006.01)
(52) U.S. Cl. .......................................... 701/13; 701/531
(58) Field of Classification Search .............. 701/13, 701/222, 226, 531
See application file for complete search history.

(56) References Cited

U.S. PATENT DOCUMENTS

| | | | |
|---|---|---|---|
| 5,745,869 A | 4/1998 | van Bezooijen | |
| 6,020,956 A | 2/2000 | Heman et al. | |
| 6,108,594 A * | 8/2000 | Didinsky et al. | 701/13 |
| 6,263,264 B1 | 7/2001 | Heman et al. | |
| 6,266,616 B1 * | 7/2001 | Needelman | 701/513 |
| 6,470,270 B1 | 10/2002 | Needelman et al. | |
| 6,512,979 B1 * | 1/2003 | Needelman et al. | 701/513 |
| 6,600,976 B1 | 7/2003 | Goodzeit et al. | |
| 6,702,234 B1 | 3/2004 | Goodzeit | |
| 6,766,227 B2 | 7/2004 | Needelman et al. | |
| 7,062,363 B2 | 6/2006 | Needelman et al. | |
| 7,920,943 B2 * | 4/2011 | Campbell et al. | 701/9 |
| 2002/0089588 A1 * | 7/2002 | LeCompte | 348/144 |
| 2007/0282529 A1 * | 12/2007 | Thompson et al. | 701/220 |

OTHER PUBLICATIONS

Ake, T.B., et al. "FUSE attitude control: target recognition and fine guidance performance." 2000, Proc SPIE, vol. 4139, p. 75 (http://violet.pha.jhu.edu/papers/technical/spie4139/4139-19.pdf).
Kruk, J.W. et al. "FUSE In-Orbit Attitude Control with Two Reaction Wheels and no Gyroscopes." 2002, SPIE, vol. 4854, paper 72. (http://violet.pha.jhu.edu/papers/technical/spie4854/spie_4854-72.pdf).
Roberts, C.E. "The SOHO Mission L1 Halo Orbit Recovery From the Attitude Control Anomalies of 1998." Liberation Point Orbits and Applications Conference Parador d'Aiguablava, Girona, Spain, Jun. 10-14, 2002. (http://europa.ieec.fcr.es/libpoint/papers/roberts.pdf).
"SOHO Gyroless User's Manual", Issue 2, Rev. 0, Matra Marconi Space, Jul. 16, 2009.
Crassidis, John L et al. "Predictive Filtering for Attitude Estimation Without Rate Sensors." Journal of Guidance Control, and Dynamics, vol. 20, No. 3, May-Jun. 1997.

* cited by examiner

*Primary Examiner* — Hussein A. Elchanti
(74) *Attorney, Agent, or Firm* — Charles L. Moore; Moore & Van Allen PLLC

(57) ABSTRACT

A method for controlling a vehicle may include sensing a position of each of a plurality of stars relative to the vehicle. The method may also include determining an attitude of the vehicle using the sensed positions of the plurality of stars, and the attitude may be determined either with or without using information from a gyro or sensor for measuring angular velocity. The method may additionally include implementing a set of strategies to optimize determination of the attitude of the vehicle when using only the sensed positions of the plurality of stars, without information from the sensor for measuring angular velocity. The method may further include controlling the vehicle based on the determined attitude of the vehicle.

38 Claims, 3 Drawing Sheets

METHOD AND SYSTEM FOR CONTROLLING A VEHICLE

BACKGROUND

The present disclosure relates to vehicles, such as space vehicles, spacecraft and the like, and more particularly to a method and system for controlling an attitude and angular velocity of the vehicle.

A major challenge for vehicle designers is "pointing performance," that is making sure that the payload, for example an antenna, is aimed at the right spot or target on the Earth or elsewhere. Pointing is often autonomous, meaning directed by onboard computers, as opposed to having a team on the ground constantly commanding the vehicle.

There are two major components affecting spacecraft autonomous pointing performance. One component is knowledge consisting of orbit determination and attitude determination. Orbit determination is knowing where the satellite is in its orbit, and what the orbit is or nature of the orbit, for example geostationary or some other type of orbit. Attitude determination is knowing the satellite's orientation with respect to some reference frame. The other major component is control. Control includes ways to change the satellite's orbit or attitude.

In addition to other sensors employed on a vehicle to determine the vehicle's orbit and attitude and to control the orbit, attitude and angular velocity, a satellite typically includes at least two inertial reference units (IRUs) for redundancy in case one fails. The IRUs measure or determine the angular velocity about each of the three orthogonal axes. Angular velocity may be defined as the spin rate of the vehicle about each one of the three axes. The need for a spare IRU has often been questioned. IRUs typically include three gyroscopes or simply gyros. Each gyro measures angular velocity about a different axis. Some IRUs are internally redundant. They include four gyros. In the event of a failure of any single gyro, the IRU software may be reprogrammed to use the remaining three gyros. Accordingly, there is some basis for maintaining that a vehicle with an internally redundant IRU should not need a separate backup IRU. This would save the expense of the spare IRU and reduce the weight of the vehicle which can translate into a significant fuel savings in launching and placing the vehicle in orbit.

Unfortunately, while failure of a gyro within an IRU is apparent from telemetry, the IRU does not provide enough information to easily decide, which one of the gyros has failed. Therefore, a ground team must determine which of the four gyros failed, then reconfigure the IRU for use with the remaining three gyros. This can take several hours which cannot be afforded in critical situations. Therefore, a separate IRU is often required for backup.

SUMMARY

The present disclosure describes a method and system for determining attitude and angular velocity of a vehicle or spacecraft with a minimal set of attitude and angular velocity sensors and without the need for a spare or back-up IRU.

In accordance with an embodiment, a method for controlling a vehicle may include sensing a position of each of a plurality of stars relative to the vehicle. The method may also include determining an attitude or an estimate of the attitude of the vehicle using the sensed position of the plurality of stars, and the attitude may be determined either with or without using information from a gyro or sensor for measuring angular velocity. The method may additionally include implementing a set of strategies to optimize determination of the attitude of the vehicle when using only the sensed positions of the plurality of stars, without information from the sensor for measuring angular velocity. The method may further include controlling the vehicle based on the determined attitude of the vehicle.

In accordance with another embodiment, a system for controlling a vehicle may include a module operating on a processor to determine an attitude of the vehicle using a sensed position of each of a plurality of stars relative to the vehicle, and either with or without using information from a sensor for measuring angular velocity or gyro. A set of strategies are used to optimize determination of the attitude of the vehicle when using only the sensed positions of the plurality of stars, without information from the sensor measuring angular velocity. The system may also include an attitude control module to control the vehicle based on the determined attitude of the vehicle.

In accordance with an embodiment, a vehicle may include a processor for controlling operation of the vehicle. The vehicle may also include a plurality of star sensors each for capturing star position information relative to the vehicle. A module operating on the processor determines an attitude of the vehicle using the star position information, either with or without using information from a sensor for measuring angular velocity. A set of strategies are used to optimize determination of the attitude of the vehicle when using only the sensed position of each of the plurality of stars, without information from the sensor for measuring angular velocity. The vehicle may also include a module to control the vehicle based on the determined attitude of the vehicle.

In accordance with a further embodiment, a computer readable storage medium having computer usable program code embodied therewith for controlling a vehicle may include computer usable program code configured to determine an attitude of the vehicle using a sensed position of each of the plurality of stars, and either with or without using information from a sensor for measuring angular velocity. The computer readable storage medium may also include computer usable program code configured to use a set of strategies to optimize determination of the attitude of the vehicle when using only the sensed position of each of the plurality of stars, without information from the sensor for measuring angular velocity. The computer readable storage medium may also include computer usable program code configured to control the vehicle based on the determined attitude of the vehicle.

Other aspects and features of the present disclosure, as defined solely by the claims, will become apparent to those ordinarily skilled in the art upon review of the following non-limited detailed description of the disclosure in conjunction with the accompanying figures.

DETAILED DESCRIPTION

Figure 1:
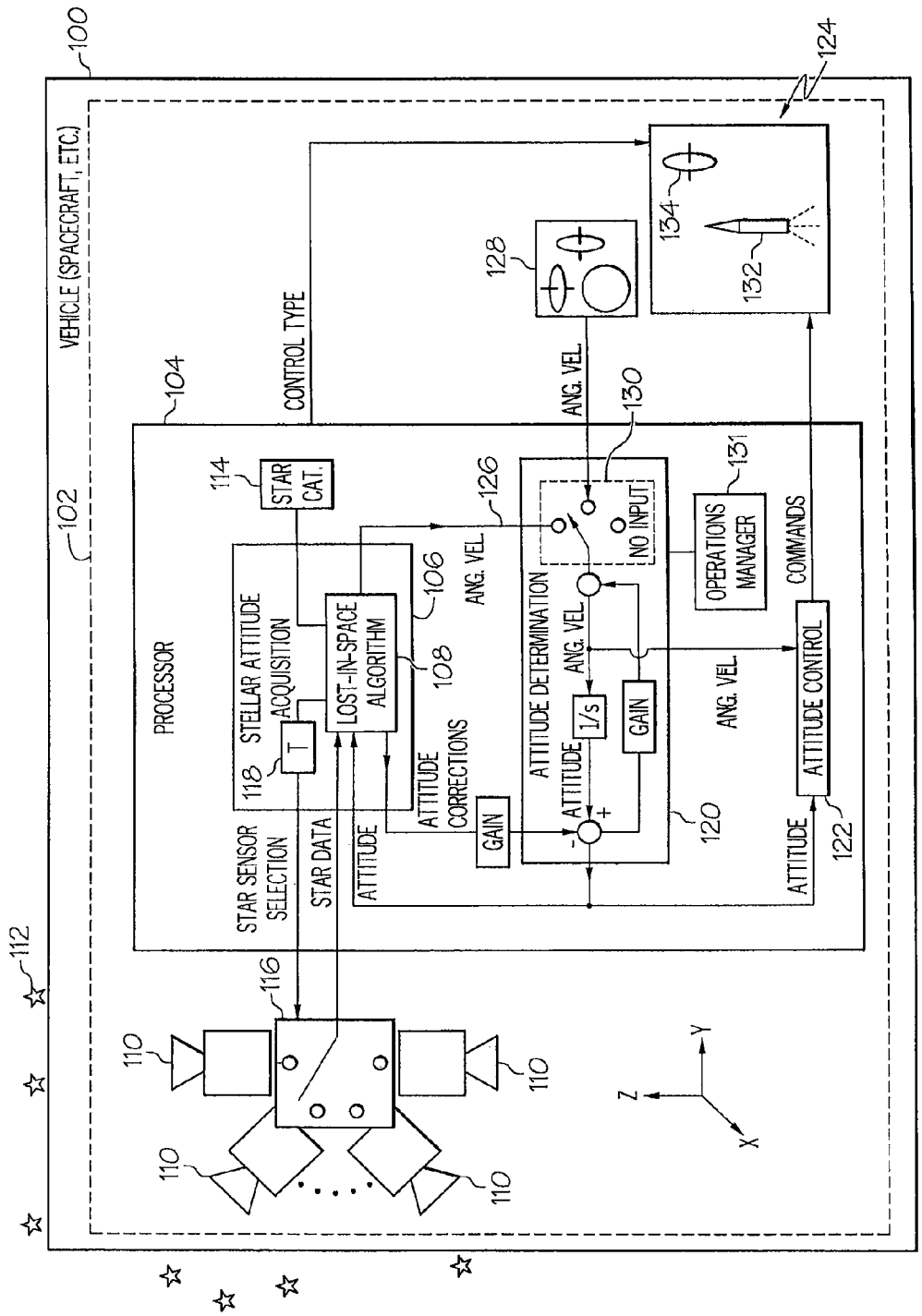
FIG. 1 is a block schematic diagram of an example of a vehicle and a system for controlling the attitude and angular velocity of the vehicle in accordance with an embodiment.

The following detailed description of embodiments refers to the accompanying drawings, which illustrate specific embodiments of the disclosure. Other embodiments having different structures and operations do not depart from the scope of the present disclosure.

As will be appreciated by one of skill in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer readable storage medium(s) having computer readable program code embodied thereon.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer-usable program code embodied therein, for example, in base band or as part of a carrier wave. Such a propagated signal may take any of a variety of forms, including, but not limited to, electro-magnetic, optical, or any suitable combination thereof, A computer readable signal medium may be any computer-readable medium that is not a computer readable storage medium and that can communicate, propagate, or transport a program for use by or in connection with an instruction execution system, apparatus, or device. Program code embodied on a computer-readable medium may be transmitted using any appropriate medium, including but not limited to wireless, wireline, optical fiber cable, RF, etc. or any suitable combination of the foregoing.

Computer program code for carrying out operations for aspects of the present disclosure may be written in an object oriented programming language such as Java, Smalltalk, C++ or the like and in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instruction means which implement the function/act specified in the flowchart and/or block diagram block or blocks.

The computer program instructions may also be loaded onto a computer, other programmable data processing apparatus, or other device to cause a series of operational steps to be performed on the computer, other programmable apparatus, or other device to produce a computer implemented process such that the instructions which execute on the computer or other programmable apparatus provide processes for implementing the functions/acts specified in the flowchart and/or block diagram block or blocks.

FIG. 1 is a block schematic diagram of an example of a vehicle 100 including a system 102 for controlling the attitude and angular velocity of the vehicle in accordance with an embodiment. The system 102 for controlling the attitude, angular velocity and orbit of the vehicle 100 may include a processor 104. The processor 104 may control all operations of the vehicle 100. The processor 104 may control several operations of the system 102, such as those described herein, autonomously without any control or input from a ground team. The processor 104 may also be programmed by the ground team to perform certain operations.

A stellar attitude acquisition module 106 for determining the attitude, and angular velocity of the vehicle 100 may be run on the processor 104. The attitude acquisition module 106 may be stored on the processor 104 or on a storage device or memory associated with the processor 104. An example of a method or process that may be used for the stellar attitude acquisition module 106 or as part of the stellar attitude acquisition module 106 will be described with reference to FIGS. 2A and 2B.

A lost-in-space (LIS) module 108 or LIS algorithm may form part of the stellar acquisition module 106 as illustrated in FIG. 1 or may be accessed by the stellar acquisition module 106 as a separate module. The LIS module 108 receives star sensor data or star position information from at least one of a plurality of star sensors 110. Each star sensor 110 is a device that registers the position of multiple stars 112 with respect to the sensor's boresight and tracks or reports on the changing position of the tracked stars 112 as the stars 112 move through the field-of view of the star sensor 110. The stars 112 appear to move through the field-of-view of the star sensor 110 because of movement of the vehicle 100; the stars 112 are not moving, or are moving very slowly (on the order of up to a few arc-seconds per year) with respect to an inertial reference frame. The LIS module 108 performs a pattern match to identify which stars 112 are being tracked. The LIS module 108 typically requires a minimum number of tracked stars, for example four stars 112, in order to have a successful and valid match. Once the LIS module 108 determines which stars are being tracked by matching star position information from a star catalogue 114, the orientation of the star sensor 110 with respect to an inertial frame may be determined. The orientation or attitude of the vehicle 100 may then be determined or is known because the star sensor 110 is mounted to the vehicle 100 and the orientation or attitude of the star sensor 110 relative to the vehicle 100 is known. The attitude of the vehicle 100 determined from the LIS module 108 as described above may be referred to herein as the LIS solution. An example of a LIS module 108 or algorithm is described in U.S. Pat. No. 6,470,270 entitled "Lost-in-Space Stellar Attitude Acquisition Using Multiple Star Tracker" by David D. Needelman et al., issued Oct. 22, 2003 and in U.S. Pat. No. 6,512,979 entitled "Lost-in-Space Stellar Attitude Acquisition Using Multiple Star Tracker" by David D. Needelman et al., issued Jan. 28, 2003. Both of which are assigned to the same assignee as the present application and are incorporated herein in their entirety by reference.

Each star sensor 110 may track up to about 5 to 8 stars depending upon the type of star sensor 110. Various different star sensors are commercially available. The sensors are characterized by several attributes, including: number of stars that may be simultaneously tracked; magnitude sensitivity; field-of-view dimensions; update rate; and many others. For example, Ball Aerospace & Technologies Corporation of Boulder, Colo. offers the CT-602 star tracker, which can track up to 5 stars, of magnitudes 1.0 to 6.0, over a field-of-view of 7.8 deg.×7.8 deg. The star tracker updates at a rate of ten times per second. The German company Jena Optronik GmbH offers the ASTRO-15 star tracker, which reports data on up to 8 stars, of magnitudes as dim as 6.5, over a field-of-view of 13.8 deg.×13.8 deg. The star tracker updates at a rate of 4 times per second. The star sensors 110 need not actually identify which stars are being tracked but rather indicate that they are seeing a star of a particular magnitude or brightness at a certain position in the field-of-view of the star sensor 110. This information is then compared or matched to data in the star catalogue 114 to determine the attitude of the vehicle 100. As described in more detail herein, the angular velocity of the vehicle 100 may also be determined using the star position information from at least one of the star sensors 110 captured and stored at different times. Based on the elapsed time between measurements or sightings and movement of the stars 112 being tracked, the angular velocity of the vehicle 100 can be determined or calculated.

A controllable switch 116 may also be provided to switch between, or select, which of the plurality of star sensors 110 may supply data to the stellar attitude acquisition module 106. There may circumstances or times when certain star sensors 110 are unable to provide sufficient data for the LIS module 108 to generate a successful LIS solution or determination of the attitude of the vehicle 100. For example, the star sensor 110 may be pointing at the Earth or Sun or tracking less than a minimum number of stars for a successful and valid LIS solution. Typically a minimum of about four stars 112 being tracked is desirable for a reliable determination of attitude and angular velocity. The stellar attitude acquisition module 106 may include a toggle determination module 118. The toggle determination module 118 may use an array of counters, with one counter corresponding to each star sensor. When the switch 116 is set so that star data from a specific star sensor 110 is fed to the stellar acquisition module 106, the counter associated with the specific star sensor 110 increments periodically, while the other counters remain unchanged. When an LIS solution is found, the counter associated with star sensor 110 is set back down to 0. When the counter reaches a specified threshold, indicating that there have been no LIS successes using the currently selected star sensor 110 for a certain period of time, the toggle determination module 118 commands a change in the setting of the switch 116, forcing the stellar acquisition module 106 to make use of another star sensor 110. The threshold for the counters may be autonomously changed by the toggle determination module 118, in response to changes in external conditions; e.g., the method of spacecraft control. For example, if the vehicle 100 is currently being controlled using thrusters 132, accurate attitude determination is more critical than if the vehicle 100 is being controlled using reaction wheels 134; therefore, the threshold is set lower in that case.

The system 102 for controlling the vehicle 100 may also include an attitude determination (ATD) module 120 operable on the vehicle processor 104. The ATD module 120 may maintain an "official" version of the attitude and angular velocity estimates of the vehicle 100. If a successful and valid LIS solution results from running the LIS module 108, the LIS solution may be used to modify the ATD attitude determination or estimate and possibly the ATD angular velocity estimate if there was a previous attitude estimate. Whether the ATD determinations or estimates are modified may be depend upon certain conditions and what software switches or other mechanisms may be set, and where the system 102 may be in the process of controlling the vehicle 100. The first few LIS solutions, vehicle attitude estimates or results from the LIS module 108 or stellar acquisition module 106 may be used to overwrite existing estimates or results from the ATD module 120. After this, the estimates or solutions from the LIS module 108 or stellar acquisition module 108 may be metered into the ATD results or estimates to avoid any sudden transients that could destabilize or affect the attitude of the vehicle 100. In other words, the ATD results may be gradually modified over time using the LIS solutions or vehicle attitude determinations to prevent destabilization of the system 102.

Accordingly, the ATD module 120 may receive attitude correction data from the LIS module 108 which may be used to modify the attitude determined by the ATD module 120. The corrected or modified attitude may be fed back to the LIS module 108 or algorithm and may also be fed to an attitude control unit 122 for commanding or controlling an actuator controller 124 to activate actuators to drive the vehicle 100 to the desired attitude and angular velocity.

The attitude correction data, discussed in the previous paragraph, will be generated only given successful LIS attempts. This means that such corrections may not occur at a regular rate. In fact, they may not occur for lengthy periods of time (e.g., when the field of view of the star sensor 110 used by the stellar acquisition module 106 is blocked by the sun, moon, or Earth). Under such circumstances, the ATD module 120 should have the capability of propagating its attitude estimate over time, between corrections. This may be done by providing or generating an angular velocity estimate.

One means for obtaining an angular velocity estimate is for the ATD module 120 to selectively receive angular velocity information from an inertial reference unit (IRU) 128. If such information is not available, or not deemed trustworthy (e.g., given a known or suspected IRU failure), a second alternative for obtaining an angular velocity estimate may be selected. The ATD module 120 may receive an angular velocity estimate input 126 from the stellar attitude acquisition module 106. Such an estimate is generated following a successful LIS attempt, provided that there was a previous successful LIS attempt. The angular velocity estimate is generated by calculating the change in spacecraft attitude between the two successful attempts (the attempt that just occurred, and the immediately previous successful attempt), and dividing by the elapsed time. This estimate assumes a constant, or nearly constant, angular velocity between the two successful attempts. The angular velocity estimate provided by the stellar attitude acquisition module 106 may be used to overwrite the current ATD angular velocity estimate. Conversely, a filtering method may be used. Filtering involves combining the latest information provided (the angular velocity estimate input from the stellar attitude acquisition module 106) with the pre-existing ATD angular velocity estimate, to produce a new angular velocity estimate. Filtering has the advantage of avoiding sudden (possibly de-stabilizing) jumps in the angular velocity estimate at the time of the updates. But filtering has the disadvantage of requiring relatively lengthy time periods, and many LIS successful attempts, to obtain an accurate angular velocity estimate. As a compromise, for a specified number of angular velocity estimates provided by the stellar acquisition module 106, the current ATD angular velocity estimate may be overwritten, allowing the ATD module 120 estimate to rapidly reach the (approximately) correct value. After the threshold number of estimates, the angular velocity is filtered, resulting in a relatively smoothly continuous angular velocity estimate.

Another method for obtaining angular velocity estimates involves allowing the ATD module 120 to determine angular velocity from its own attitude estimates, using a filter, with the angular velocity estimate changes being dependent on the changes in the attitude estimates.

A switch 130 may be set to allow the ATD module 120 to selectively receive angular velocity information from different sources. One setting of the switch 130 allows the ATD module 120 to receive angular velocity information from the IRU 128. Alternatively, the switch 130 may be set to receive angular velocity information from the stellar acquisition module 106, or the switch 130 may connect to a no input switch position to not receive any angular velocity data or information. The setting of the switch 130 may be controlled by a spacecraft operations manager module 131, based on current spacecraft conditions. For example, if the IRU 128 is functioning nominally, the switch 130 may be set so as to feed IRU angular velocity estimates to the ATD module 120.

The IRU 128 includes multiple sensors or gyros oriented in correspondence with the three major orthogonal axes to measure angular velocity about the different axes. As previously discussed, vehicles have previously been designed to include redundant IRUs so that if one fails or is temporarily out of service, the other can perform any needed angular velocity measurements. Because the LIS module 108 and stellar attitude acquisition module 108 are configured as described herein to determine angular velocity, the exemplary vehicle 100 does need a second or redundant IRU. The IRU 128 typically may only be needed when the stellar attitude acquisition module 106 and the LIS module 108 may temporarily be unable to determine angular velocity.

The attitude control unit 122 may then receive modified or corrected attitude information and angular velocity information or data that may be used to control actuators 124 to move the vehicle 100 into a desired attitude and angular velocity. The vehicle 100 may include different types of actuators 124 or devices to control the vehicle 100 including devices for controlling the attitude, angular velocity and orbit of the vehicle 100. Examples of devices for controlling the attitude, angular velocity and obit of the vehicle 100 may include propulsion devices 132 and motorized wheels 134. Examples of propulsion devices 132 may include thrusters, liquid apogee engines (LAEs) or similar rocket or propulsion devices. These propulsion devices 132 can be commanded to fire under computer control to provide the desired attitude, angular velocity and orbit. Propulsion devices 132 are not used unless absolutely necessary because of the limited quantity of fuel onboard the vehicle 100.

Motorized wheels 134 may be used to rotate the vehicle 100 about a selected axis. A motorized wheel 134 may be associated with each of the three orthogonal axes X, Y and Z as illustrated in FIG. 1. The motorized wheel 134 may be commanded to spin in a chosen direction (clockwise or counterclockwise) to cause the vehicle 100 to spin in an opposite direction about the selected axis because of conservation of angular momentum. Conversely, more than three wheels may be used, in order to allow a backup should one wheel fail. When extra wheels are used, the wheels need not be placed so that their axes are orthogonal.

Another control mode for the vehicle 100 is not to use any actuators and to allow the vehicle 100 to drift in space. If, for example, the vehicle 100 has a problem with a key component onboard, activation of any control actuator can make the problem worse. All actuators can be turned off and the vehicle 100 can be allowed to drift until the problem is solved or a solution determined.

Figure 2A:
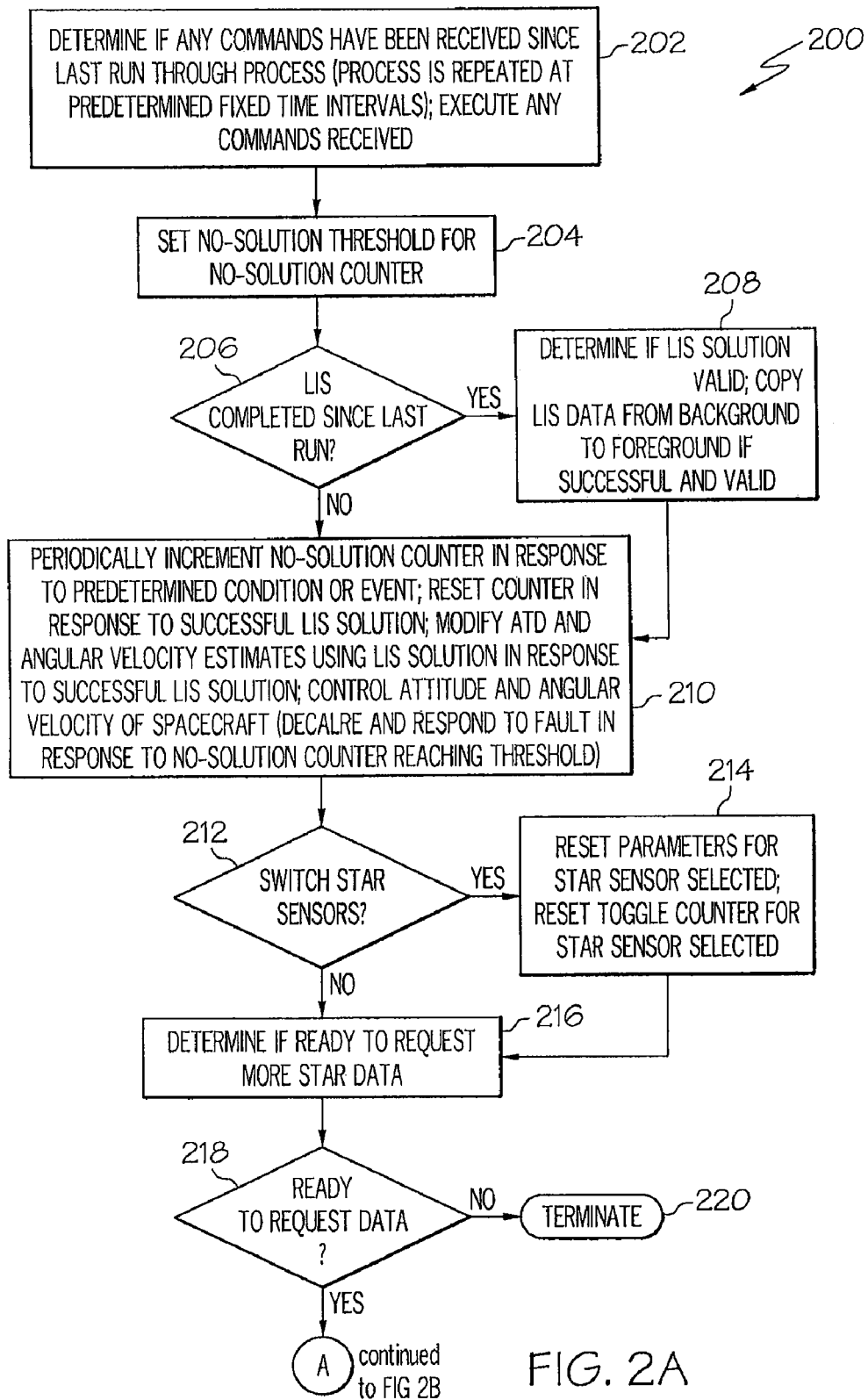
FIGS. 2A and 2B (collectively FIG. 2) is a flow chart of an example of a method for controlling attitude and angular velocity in accordance with another embodiment.
Figure 2B:
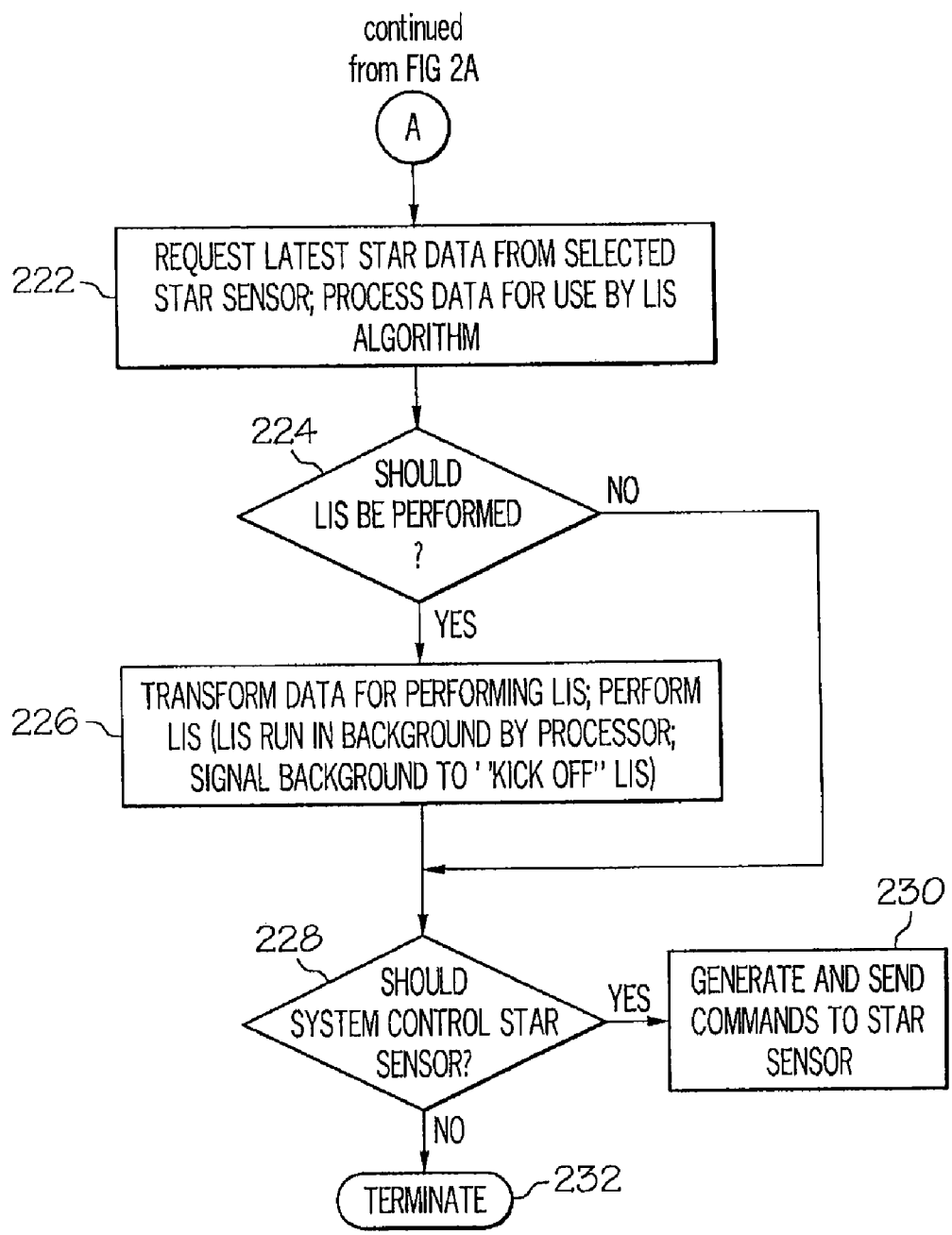

FIGS. 2A and 2B (collectively FIG. 2) is a flow chart of an example of a method 200 for controlling attitude and angular velocity of a vehicle in accordance with another embodiment. The method 200 may be embodied in or performed by the stellar attitude acquisition module 106 in FIG. 1. In block 202, a determination may be made if any commands have been received since the last run of the method 200. The method 200 or stellar attitude acquisition module 106 may be run or repeated at a predetermined fixed time interval or frequency. Commands may be received from a ground team or Earth station or from other system components to execute changes to the system. For example, operation of the method 200 or stellar attitude acquisition 106 may be turned on in response to a problem, such as failure of another system or vehicle component or for some other reason, or turned off if no longer needed. If any commands to change the system have been received since the last cycle through the method 200, the commands may be executed before the method 200 continues.

In block 204, a no-solution threshold may be set for a no-solution counter. The no-solution counter may be periodically incremented in response to a predetermined condition or event. The no-solution counter is incremented by 1 every time method 200 or stellar attitude acquisition is run. The no-solution counter is reset to 0 if a successful LIS solution is found or determined. A fault may be declared in response to the no-solution counter reaching the preset threshold. The fault may be responded to in a number of different ways depending on the nature or cause of the fault. For example, responding to the fault may include switching from a single star sensor mode of operation, where only a single star sensor is being used, to a multiple star sensor mode where two or more star sensors are tracking stars and collecting star information for use in determining the attitude and angular velocity of the vehicle. Another example of a response to a fault may be switching control of the attitude and angular velocity of the vehicle from one type of control or mode of control to another mode of control of a plurality of modes of control. Examples of different modes or types of control may include controlling the vehicle by a plurality of thrusters, controlling the vehicle by a plurality of motorized wheels each corresponding to a different axis of rotation of the vehicle, controlling the vehicle by a combination of thrusters and motorized wheels, allowing the vehicle to drift, or similar modes of control. The no-solution threshold may be low when the mode of control involves thrusters or propulsion devices since these require fuel and may be high for modes of control involving wheels or no control or allowing the vehicle to drift.

In block 206, a determination may be if background tasks or the LIS module or algorithm has completed since the last run or operation of the method 200, determination of the attitude, attitude estimate, or stellar attitude acquisition. High-priority tasks, such as the method 200 or attitude determination are run in the "foreground" by the vehicle processor or in other words take precedence or priority over other tasks or processes, such as LIS, which may be run in the background or at times when no foreground or higher priority tasks or processes are being run. The method 200 or stellar attitude acquisition is run at fixed scheduled times. Accordingly, in block 206, a determination is made if an LIS run has been completed and an LIS solution found or determined since the last time the method 200 was run. If an LIS solution was determined since the last run through method 200, the method 200 may advance to block 208. In block 208, a determination is made whether the LIS solution was obtained or found and valid. If the LIS solution was found and valid, the LIS solution corresponding to the vehicle attitude information may be copied from background memory to foreground memory of the vehicle processor for use by the method 200 since the background and foreground processes are independent, and the method 200 or stellar attitude acquisition is run in the foreground of the processor as previously described.

The LIS attempt is successful if a star pattern match is found between the star sensor information and the star position information stored in the star catalogue.

The LIS solution may be determined to be invalid, and, therefore, ignored by the stellar acquisition module 106, if an event occurred during running of the LIS module or algorithm that may cause the LIS solution or vehicle attitude determination or estimation to be unreliable. For example, a stellar acquisition re-initialization may be commanded, and executed in the foreground, while running the LIS algorithm 108 in the background. A re-initialization will result in stellar acquisition module 106 parameters being set to initial values to start the process over. E.g., lists of star and pair data are zeroed out, counters are reset to zero, and the attitudes from previously successful LIS attempts are ignored. If some critical values are reset, the LIS solution cannot be trusted and cannot be used. The LIS solution may also not be reliable if performed during maneuvering of the vehicle or immediately after receiving commands and transitioning to a new attitude or orbit.

In block 206, if an LIS solution or run was not completed since the last run of the method 200 or stellar attitude acquisition, the method 200 may advance to block 210. In block 210, the no-solution counter may be incremented periodically in response to a predetermined condition or event as previously discussed. The no-solution counter may also be incremented in response to the LIS solution being unsuccessful and for other reasons, such as the star sensor not sensing any stars. Alternatively, the no-solution counter may be reset in response to a successful LIS solution. As previously discussed the vehicle may have a separate code module for attitude determination (ATD). The ATD module may maintain an official version of the attitude and angular velocity estimates. The ATD attitude estimate may be modified by the attitude resulting from the LIS solution in response to the LIS solution being successful and valid. The angular velocity estimate may also be modified if there was a previous attitude estimate. As previously discussed, the angular velocity of the vehicle may be determined using only star position information captured and stored at different times by at least one of the star sensors. Accordingly, angular velocity may be determined without need for an IRU. The attitude and angular velocity of the vehicle may then be controlled based on the results from the LIS module and stellar attitude acquisition module solely using star sensor data without the need for information from an IRU or other sensors.

In block 210, the attitude determination performance of the LIS module may also be used to autonomously change the control type or mode or which type of actuators may be used to control the attitude and angular velocity of the vehicle. The period of time or number of cycles of the LIS module or algorithm may be monitored to determine the period of time or number of cycles that have occurred since a successful LIS solution. As previously discussed, a no-solution counter or similar device may be used to monitor the LIS module or algorithm and a fault may be declared in response to reaching a preset threshold or predetermined limit. If the time has exceeded the predetermined limit or number of cycles since a successful LIS solution, the current control of the vehicle may be switched from one group or set of actuators to another or from one mode or type of control to another. For example, control may be switched from propulsion devices or motorized wheels to none or no use of actuators to allow the vehicle to drift. The time period or cycles without a successful LIS solution before a switch or change is made in control type or mode may vary dependent upon the control type or type of actuators currently being used. For instance, a switch from propulsion devices or thruster to none or no actuator control mode may occur in a much shorter time frame than from using wheels to no actuator control. Alternatively, if the vehicle is currently in a none control mode, then when enough successful LIS solutions have been found, the attitude and angular velocity solutions may be said to have converged. Under this circumstance, the system may switch from an uncontrolled mode to a wheel-based control mode.

In block 212, a determination may be made whether to switch to a different star sensor. A different star sensor may be selected in response to the LIS solution being unsuccessful after a predetermined number of runs of the method 200 or the stellar attitude acquisition module. As previously discussed, the system may include a toggle associated with each star sensor. The toggle counter associated with the star sensor supplying data for the LIS solution may be incremented each time the LIS solution is unsuccessful based on the data from the current star sensor. Another star sensor may be selected or switched to connect to the LIS module in response to the toggle counter of the current star sensor reaching a preset threshold. The attitude determination performance of the LIS module may then be used to autonomously change which star sensor is used for determining the LIS solution. Accordingly, if an LIS solution cannot be found with one star sensor, the system may autonomously switch to another star sensor. Control of the switching time for the star sensors is based on the time to change the control type or mode so that star sensors may be switched before switching control type.

Tests may be set up to validate the LIS solutions. A key concern is mis-acquisition of the LIS module, e.g., coming up with the incorrect star pattern match. Mis-acquisition can occur, for example, if the star sensor mistakes a planet for a star and the planet is just in the wrong place allowing a false pattern match. There are two tests that may be used to reject bad LIS solutions or invalidate an LIS solution. The first test is a trajectory test. The trajectory test calculates or determines what the vehicle's attitude should be based on at least two previous LIS solutions, and makes sure the current LIS solution is consistent. The second test is a convergence test. The convergence test looks at predicted attitude based on a long history of LIS solutions and makes sure the current LIS solution is consistent.

Attitude estimates may be modified in block 210 differently based on a history of LIS solutions. For the first few LIS solutions, the attitude and angular velocity estimates or determinations from the ATD module are completely changed to be consistent with LIS solutions from the LIS module or algorithm. After this, corrections to the estimates from the ATD are metered or only partially corrected a little bit at time based on the LIS solutions. In this manner significant or large changes are not made if the ATD estimates or determinations significantly differ from the LIS solutions. Accordingly, several small changes are made over time to avoid any instabilities in the solution or wild oscillations in the estimates even when attitude is not changing much.

In block 212, if a determination is made to switch to another star sensor, the method 200 advances to block 214. In block 214, parameters of the system are reset for the star sensor selected or being used. The toggle counter associated with the new star sensor is set to 0.

If the determination in block 212 is that there is no need to switch star sensors, the method 200 may advance to block 216. In block 216, a determination may be made if the stellar attitude acquisition module or LIS module is ready for more star data from the star sensor. The system may not be ready for new star data if the data that is available is from the star sensor that is not currently being used for the LIS solution. This may happen about half the time if there are two star sensors and only one is used at a time. The system may also not be ready for new star data if the attitude estimate was just changed and system adjustments need to be completed before new data is received. The system may also not be ready for new star data if the system is set up to only receive data at certain fixed time periods and a current fixed time period has not elapsed.

If a determination is made in block 218 that the system is not ready to request new star data, the method 200 may terminate at termination 220. If the system is ready to request new data in block 218, the method 200 may advance to block 222. In block 222, the latest star data may be requested from the star sensor currently selected for use in determining the LIS solution. The data received from the current star sensor may be processed for use by the LIS algorithm or module. The processing consists of a plurality of steps, including translating the star position, as reported by the star tracker, into a unit vector with respect to some reference frame. This frame may be, for example, the inertial frame defined by the current attitude estimate from the ATD module.

In block 224, a determination may be made if the LIS module or algorithm should be run. A determination is made whether the LIS attempt can be successful based on the star data available. The criteria used to determine whether a LIS attempt can be successful depend upon the particular LIS method run. For example, the LIS method described in U.S. Pat. Nos. 6,470,270 and 6,512,979 necessary, but not sufficient, conditions for LIS success are that a minimum number (e.g., four) of stars must be represented by the star data, and that at least two stars represented in the data have magnitudes, and an angular separation, within a specified range.

If a determination is made in block 224 that the LIS module should be or can be run, the method 200 may advance to block 226; otherwise, this block 226 is skipped. In block 226, the star data may be transformed to a form for use by the LIS module. For example, lists of the stars represented by the star data, and lists of the possible star pairs for use by LIS, are generated. The lists are the input to the LIS module. The LIS algorithm or module may be run in the background by the processor, as previously described. That is, the processor may run the LIS algorithm, subject to interruptions by higher priority tasks run in the foreground by the processor.

In block 228, a determination may be made whether the system should control or steer the star sensor. Only the decision is made in block 228. If the decision is made that the system should control or steer the star sensor, the method 200 will advance to block 230. The LIS algorithm or module needs at least two bright stars to generate a successful LIS solution. To maximize the chances of success and to insure that multiple different stars are tracked, under certain conditions, the LIS module may transmit a "cancel-star" command to the star sensor currently being used in block 230. The LIS module will cancel the track on the dimmest star and establish tracking on a brighter star.

If a determination is made in block 228 that the system does not need to steer the star sensor, the method 200 may terminate at block termination 232.

As previously discussed, the method 200 or the stellar attitude acquisition module or algorithm may be scheduled to run at predetermined time intervals. For example, the stellar attitude acquisition module may run about every 0.5 seconds. Accordingly, the method 200 will run again when the time interval elapses or the scheduled time occurs.

The flowcharts and block diagrams in FIGS. 1 and 2 illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the disclosure has other applications in other environments. This application is intended to cover any adaptations or variations of the present disclosure. The following claims are in no way intended to limit the scope of the disclosure to the specific embodiments described herein.

What is claimed is:

1. A method for controlling a vehicle, comprising:
sensing a position of each of a plurality of stars relative to the vehicle;
determining an attitude of the vehicle using the sensed positions of the plurality of stars, and either with or without using information from a sensor measuring angular velocity;
implementing a set of strategies to optimize determination of the attitude of the vehicle when using only the sensed positions of the plurality of stars, without information from the sensor for measuring angular velocity, wherein implementing the set of strategies comprises determining if a lost-in-space (LIS) solution is invalid by applying at least one of a plurality of tests to the LIS solution, the plurality of tests comprising:
a trajectory test comprising determining if the LIS solution is inconsistent with a vehicle trajectory, as estimated by two previous LIS solutions, from which an estimated attitude is determined; and
a convergence test comprising determining if the LIS solution is inconsistent with a spacecraft attitude and angular velocity estimates, as determined by processing of attitude estimates from multiple previous LIS solutions, or attitude estimates based on other sources; and
controlling the vehicle based on the determined attitude of the vehicle.

2. The method of claim 1, further comprising determining an angular velocity of the vehicle using only star position information from at least one star sensor captured and stored at different times.

3. The method of claim 1, further comprising determining whether a valid lost-in-space (LIS) solution was found since a previous determination of the attitude of the vehicle, wherein determining the LIS solution comprises finding a star pattern match between star position information captured by at least one star sensor and star position information stored in a star catalogue stored in association with an onboard vehicle processor, the LIS solution being valid when the star pattern match is correct, and leads to an accurate vehicle attitude estimate.

4. The method of claim 3, further comprising:
periodically incrementing a no-solution counter in response to a predetermined condition or event; and
resetting the no-solution counter to zero in response to the LIS solution being found.

5. The method of claim 4, wherein using implementing the set of strategies to optimize determination of the attitude of the vehicle further comprises:
declaring a fault in response to the no-solution counter reaching a preset threshold; and
responding to the fault, wherein responding to the fault comprises at least one of:
switching from a single star sensor mode of operation to a multiple star sensor mode of operation; and
switching control of the attitude and angular velocity of the vehicle from one mode of control to another mode of control of a plurality of modes of control.

6. The method of claim 5, wherein the plurality of modes of control comprise:
controlling the vehicle by a plurality of thrusters,
controlling the vehicle by a plurality of wheels each corresponding to a different axes of rotation of the vehicle,
controlling the vehicle by a combination of thrusters and wheels, and
allowing the vehicle to drift.

7. The method of claim 5, wherein the multiple star mode sensor mode of operation comprises switching to another star sensor of a plurality of star sensors in response to consistently failing to obtain a LIS solution after a specified time period or a predetermined number of runs of the stellar acquisition module.

8. The method of claim 7, wherein a toggle counter is associated with each star sensor, and wherein the method further comprises:
incrementing the toggle counter associated with each star sensor currently being used for the LIS solution each time the LIS solution associated with the star sensor is not obtained; and
switching to another star sensor for capturing star positions for the LIS solution in response to the toggle counter associated with the at least one star sensor currently being used for the LIS solution reaching a preset threshold.

9. The method of claim 3, further comprising determining if the LIS solution is invalid in response to determining the LIS solution.

10. The method of claim 9, wherein determining if the LIS solution is invalid comprises determining if an event occurred causing the LIS solution to be unreliable.

11. The method of claim 1, wherein determining if the LIS solution is inconsistent comprises determining a discrepancy between two attitudes, and evaluating whether the discrepancy exceeds a predetermined threshold value.

12. The method of claim 1, wherein applying the trajectory test is based on whether there have been at least two previous LIS solutions within a specified or predetermined time period.

13. The method of claim 1, wherein applying the convergence test is based on whether there have been a specified number of LIS solutions within a specified or predetermined time period.

14. The method of claim 1, further comprising determining if ready to request star position information from a star sensor currently selected from a plurality of star sensors mounted to the vehicle, for use in determining an attitude of the vehicle, wherein determining if ready to request the star position information comprises at least one of:
determining if the star position information is available from the star sensor currently selected;
determining if a new attitude has just been determined and system adjustments need to be completed before determining another attitude; and
determining that the star position information is only being captured at certain fixed time periods and determining whether a current fixed time period has elapsed.

15. The method of claim 1, further comprising:
determining if a sufficient number of stars have been tracked for determining an attitude of the vehicle; and
determining if a sufficient number of pairs of the tracked stars meet a predetermined criteria.

16. The method of claim 1, further comprising:
determining whether a currently selected star sensor for capturing star position information for determining an attitude of the vehicle needs to be steered to track a different star; and
generating and sending a command to the currently selected star sensor to cancel tracking of a dimmest star and to establish tracking on a brighter star in response to determining that the currently selected star sensor needs to be steered, wherein the star sensor is capable of tracking multiple stars simultaneously.

17. The method of claim 1, further comprising determining the attitude of the vehicle at predetermined time intervals.

18. The method of claim 17, further comprising overwriting an existing attitude maintained by a component of the vehicle with a predetermined number of initial determinations of the attitude of the vehicle.

19. The method of claim 18, further comprising metering the determinations of the attitude of the vehicle into the existing attitude maintained by the component after overwriting the existing attitude with the predetermined number of initial determinations of the attitude of the vehicle to avoid any sudden transients that could destabilize control of the vehicle.

20. The method of claim 17, further comprising overwriting an existing angular velocity maintained by a component of the vehicle with a predetermined number of initial determinations of the angular velocity of the vehicle.

21. The method of claim 20, further comprising metering the determinations of the angular velocity of the vehicle into the existing angular velocity maintained by the component after overwriting the existing angular velocity with the predetermined number of initial determinations of the angular velocity of the vehicle to avoid any sudden transients that could destabilize the attitude or angular velocity estimates, or control of the vehicle.

22. A system for controlling a vehicle, comprising:
 a processor;
 a module operating on the processor to determine an attitude of the vehicle using a sensed position of each of a plurality of stars relative to the vehicle, and either with or without using information from a sensor measuring angular velocity, wherein a set of strategies are used to optimize determination of the attitude of the vehicle when using only the sensed positions of the plurality of stars, without information from the sensor measuring angular velocity, wherein the set of strategies comprises determining if a lost-in-space (LIS) solution is invalid by applying at least one of a plurality of tests to the LIS solution, the plurality of tests comprising:
  a trajectory test comprising determining if the LIS solution is inconsistent with a vehicle trajectory, as estimated by two previous LIS solutions, from which an estimated attitude is determined; and
  a convergence test comprising determining if the LIS solution is inconsistent with a spacecraft attitude and angular velocity estimates, as determined by processing of attitude estimates from multiple previous LIS solutions, or attitude estimates based on other sources; and
 an attitude control module, operating on the processor, to control the vehicle based on the determined attitude of the vehicle.

23. The system of claim 22, further comprising a module to determine an angular velocity of the vehicle using only star position information captured and stored at different times by a star sensor.

24. The system of claim 22, further comprising a star catalogue including a plurality of star identities and associated star position information, wherein a lost-in-space (LIS) module matches star position information sensed by at least one star sensor to the star position information in the star catalogue to provide a LIS solution.

25. The system of claim 24, further comprising a no-solution counter, wherein the no-solution counter is periodically incremented and wherein the no-solution counter in reset in response to obtaining the LIS solution.

26. The system of claim 24, further comprising a switch means to switch to another star sensor of a plurality of star sensors for capturing star position information in response to the no-solution counter reaching a preset threshold.

27. The system of claim 26, further comprising a toggle counter associated with each star sensor, wherein the toggle counter associated with the star sensor currently being used for the LIS solution is incremented each time the LIS solution is not found and switching to another star sensor for capturing star positions for the LIS solution in response to the toggle counter associated with the star sensor currently being used for the LIS solution reaching a preset threshold.

28. The system of claim 25, wherein the set of strategies to optimize determination of the attitude of the vehicle comprises:
 declaring a fault in response to the no-solution counter reaching a preset threshold; and
 responding to the fault, wherein responding to the fault comprises at least one of:
  switching from a single star sensor mode of operation to a dual star sensor mode of operation; and
  switching control of the attitude and angular velocity of the vehicle from one mode of control to another mode of control of a plurality of modes of control.

29. A vehicle, comprising:
 a processor for controlling operation of the vehicle;
 a plurality of star sensors each for capturing star position information relative to the vehicle;
 a module operating on the processor to determine an attitude of the vehicle using the star position information, either with or without using information from a sensor measuring angular velocity, wherein a set of strategies are used to optimize determination of the attitude of the vehicle when using only the sensed position of each of the plurality of stars, without information from the sensor measuring angular velocity, wherein the set of strategies comprises determining if a lost-in-space (LIS) solution is invalid by applying at least one of a plurality of tests to the LIS solution, the plurality of tests comprising:
  a trajectory test comprising determining if the LIS solution is inconsistent with a vehicle trajectory, as estimated by two previous LIS solutions, from which an estimated attitude is determined; and
  a convergence test comprising determining if the LIS solution is inconsistent with a spacecraft attitude and angular velocity estimates, as determined by processing of attitude estimates from multiple previous LIS solutions, or attitude estimates based on other sources; and
 a module to control the vehicle based on the determined attitude of the vehicle.

30. The vehicle of claim 29, further comprising:
 a stellar attitude acquisition module running on the processor;
 a LIS module for determining the LIS solution, wherein the stellar attitude acquisition module determines whether a valid LIS solution was found since a previous running of the stellar attitude acquisition module and modifies an estimate of an attitude of the vehicle using the LIS solution in response to the LIS solution being determined to be valid, and wherein the LIS solution is determined using only star position information relative to the vehicle from at least one star sensor of the plurality of star sensors mounted on the vehicle.

31. The vehicle of claim 30, further comprising a star catalogue including a plurality of star identities and associated position information for each of the stars, wherein the LIS module matches the star position information captured by the at least one star sensor to star position information in the star catalogue to provide the LIS solution.

32. The vehicle of claim 29, further comprising a no-solution counter, wherein the no-solution counter is periodically incremented in response a predetermined condition or event and wherein the no-solution counter in reset in response to the LIS solution being found.

33. The vehicle of claim 32, further comprising:
a plurality of thrusters mounted to the vehicle to control the attitude and angular velocity of the vehicle;
a plurality of wheels mounted to the vehicle, each wheel corresponding to a different axis of rotation of the vehicle for rotating the vehicle about the respective axes, wherein a fault occurs in response to the no-solution counter reaching a preset threshold, and wherein the fault is responded to by at least one of:
switching from a single star sensor mode of operation to a dual star sensor mode of operation; and
switching control of the attitude and angular velocity of the vehicle from one mode of control to another mode of control of a plurality of modes of control, wherein the plurality of modes of control comprise: controlling the vehicle by a plurality of thrusters, controlling the vehicle by a plurality of wheels each corresponding to a different axes of rotation of the vehicle, controlling the vehicle by a combination of thrusters and wheels, and allowing the vehicle to drift.

34. A computer program product comprising a hardware computer readable storage medium having computer usable program code embodied therewith for controlling a vehicle, the hardware computer readable storage medium comprising:
computer usable program code configured to determine an attitude of the vehicle using a sensed position of each of the plurality of stars, and either with or without using information from a sensor measuring angular velocity;
computer usable program code configured to use a set of strategies to optimize determination of the attitude of the vehicle when using only the sensed position of each of the plurality of stars, without information from the sensor for measuring angular velocity, wherein computer usable program code configured to use the set of strategies comprises computer usable program code configured to determine if a lost-in-space (LIS) solution is invalid by applying at least one of a plurality of tests to the LIS solution, the plurality of tests comprising:
a trajectory test comprising determining if the LIS solution is inconsistent with a vehicle trajectory, as estimated by two previous LIS solutions, from which an estimated attitude is determined; and
a convergence test comprising determining if the LIS solution is inconsistent with a spacecraft attitude and angular velocity estimates, as determined by processing of attitude estimates from multiple previous LIS solutions, or attitude estimates based on other sources; and
computer usable program code configured to control the vehicle based on the determined attitude of the vehicle.

35. The computer readable storage medium of claim 34, further comprising computer usable program code configured to determine an angular velocity estimate of the vehicle using only star position information from the at least one star sensor captured and stored at different times.

36. The computer readable storage medium of claim 34, further comprising computer usable program code configured to determine whether the LIS solution was found, wherein the LIS solution comprises finding a star pattern match between the star position information captured by the at least one star sensor and star position information stored in a star catalogue.

37. The computer readable storage medium of claim 36, further comprising computer usable program code configured to periodically increment a no-solution counter in response to a predetermined condition or event and to reset the no-solution counter to zero in response to the LIS solution being found.

38. The computer readable storage medium of claim 37, further comprising:
computer usable program code configured to declare a fault in response to the no-solution counter reaching a preset threshold; and
computer usable program code configured to respond to the fault, wherein responding to the fault comprises at least one of:
switching from a single star sensor mode of operation to a dual star sensor mode of operation; and
switching control of the attitude and angular velocity of the vehicle from one mode of control to another mode of control of a plurality of modes of control.

* * * * *

UNITED STATES PATENT AND TRADEMARK OFFICE
CERTIFICATE OF CORRECTION

| | | |
|---|---|---|
| PATENT NO. | : 8,265,804 B1 | Page 1 of 1 |
| APPLICATION NO. | : 12/475072 | |
| DATED | : September 11, 2012 | |
| INVENTOR(S) | : David S. Uetrecht | |

It is certified that error appears in the above-identified patent and that said Letters Patent is hereby corrected as shown below:

Column 13, Line 48, Claim 5: "The method of claim 4, wherein using implementing the" should be --The method of claim 4, wherein implementing the--

Signed and Sealed this
Twenty-third Day of October, 2012

David J. Kappos
*Director of the United States Patent and Trademark Office*